United States Patent [19]

Asami et al.

[11] Patent Number: 4,514,367

[45] Date of Patent: Apr. 30, 1985

[54] METHOD FOR SEPARATING RARE EARTH METALS

[75] Inventors: Tadao Asami, Yokohama; Tetsuro Suehiro; Hisao Ichijo, both of Yatabemachi; Aizo Yamauchi, Sakuramura; Shigeo Ogawa, Yatabemachi; Mitsuo Suzuki; Mitsutaka Uzumaki, both of Tokyo, all of Japan

[73] Assignees: Agency of Industrial Science & Technology; Nitivy Co., Ltd.; Seimi Chemical Co., Ltd., all of Japan

[21] Appl. No.: 497,871

[22] Filed: May 25, 1983

[51] Int. Cl.$^3$ .............................................. C01F 17/00
[52] U.S. Cl. ............................ 423/21.5; 75/101 BE; 423/DIG. 14
[58] Field of Search ...................... 423/21.5, DIG. 14; 75/101 BE

[56] References Cited

U.S. PATENT DOCUMENTS

| | | | |
|---|---|---|---|
| 2,877,093 | 3/1959 | Tompkins et al. | 423/21.5 |
| 3,033,646 | 5/1962 | Hansen | 423/21.5 |
| 3,037,841 | 6/1962 | Krumholz | 423/21.5 |
| 4,393,353 | 7/1983 | Miyake et al. | 423/21.5 |

FOREIGN PATENT DOCUMENTS

| | | | |
|---|---|---|---|
| 53-137889 | 12/1978 | Japan | 423/21.5 |
| 58-45341 | 3/1983 | Japan | 423/21.5 |

OTHER PUBLICATIONS

Miyamatsu et al., (1) "Chem. Absts.", vol. 98, Feb. 1983, #57748c.

Miyamatsu et al., (2), "Chem. Absts.", vol. 98, Mar. 1983, #76013a.

Akiyama et al., "Chem. Absts.", vol. 96, 1982, #163866h.

Primary Examiner—Herbert T. Carter
Attorney, Agent, or Firm—Kane, Dalsimer, Kane, Sullivan and Kurucz

[57] ABSTRACT

Rare earth metals are adsorbed on an ion exchange fiber comprising an ion exchanger having a strong cation exchange group and a weak cation exchange group, and the adsorbed metals are fractionally eluted with an aqueous solution of a chelating agent, whereby the respective rare earth metals can be separated at high efficiency in a short time. According to this method, elution can be accomplished at an elution rate of 5.0 or above in terms of space velocity.

3 Claims, No Drawings

METHOD FOR SEPARATING RARE EARTH METALS

BACKGROUND OF THE INVENTION

This invention relates to a method for separating rare earth metals at high efficiency. More particularly, it relates to a method for separating and recovering rare earth metals at a high elution rate and high efficiency by using an ion exchange fiber.

Rare earth metals such as lanthanum, yttrium, cerium, neodymium, samarium and the like are widely used as a component of ceramic material, hydrogen absorbent, alloy component, catalyst component, or the like. Usually these metals occur in a mingled state, so that they have to be separated into a pure component. However, since the rare earth metals are closely akin to each other in properties, their separation is attended by great difficulties, and only a few metals such as cerium and europium can be finely separated by conventional separation means such as fractional crystallization and fractional precipitation.

A method using an ion exchange resin has been proposed (Journal of Chromatography, 66, 129–135 (1972); 76, 213–220 (1973), but this method is yet unsatisfactory for practical application because it is of a batch type and requires as long a time as several tens of days for one run of separating operation and the apparatus is enlarged to cause reduction in productivity. Solvent extraction is a technique which is most commonly used as an established method for the metal separation, but this method is also not always satisfactory as an industrial process because of complicacy of the operation and the problem in disposal of the used solvent. Thus, the development of a method which enables separation of rare earth metals in a high purity by a simple, non-time-consuming operation has been a matter of primary concern in the industrial fields using rare earth metals.

SUMMARY OF THE INVENTION

An object of the present invention is to provide a method for separating and recovering rare earth metals at a high elution rate and high efficiency by using an ion exchange fiber as adsorbent.

The separation method according to this invention is characterized by selectively adsorbing rare earth metals on an ion exchanger and fractionally eluting them with an aqueous solution of a chelating agent by using as the ion exchanger an ion exchange fiber having a strong cation exchange group and a weak cation exchange group, the elution rate being kept at 5.0 or above in terms of space velocity.

DETAILED DESCRIPTION OF THE INVENTION

Acid extracts of monazite, yttrium phosphate ore, bastnaesite or the like and an acid solution of misch metal may be mentioned as typical examples of rare earth metal-containing substances usable as starting material in the method of this invention. These substances are usually adjusted to a rare earth metal concentration of 10 to 30 g/l and a pH of 0.5 to 3.0 for use.

On the other hand, the ion exchange fiber used in the method of this invention is typically one composed of a polymer having a strong cation exchange group such as a sulfonic acid group and a weak cation exchange group such as a carboxyl group. It is desirable that these strong and weak cation exchange groups in the ion exchange fiber have an ion exchange capacity of 1.0 meq/g or higher, and the strong to weak cation exchange group molar ratio is preferably within the range of 5:1 to 1:1.

Such an ion exchange fiber can be produced in the following way, for instance.

A polyvinyl alcohol having an average polymerization degree of 1,000 to 3,000 is spun and the obtained fiber is subjected to a heat treatment in the air or in an inert gas atmosphere at 150° to 230° C. for several hours and then further treated in concentrated sulfuric acid at 50° to 100° C. for several hours, whereby there take place formation of polyene by dehydration of polyvinyl alcohol and formation of carboxyl groups by oxidation of alkyl groups as well as sulfonation to produce a desired ion exchange fiber. The ion exchange capacity of this fiber and the strong to weak cation exchange group molar ratio can be adjusted by properly changing the heat treating conditions in the air or in an inert gas atmosphere and the treating conditions in sulfuric acid.

This ion exchange fiber may be used as such by directly filling it in a suitable column, or it may be interlaced in a known way before filling in the column.

Regarding the chelating agent used for eluting the rare earth metals adsorbed on said ion exchange fiber in the method of this invention, it is possible to use a known chelating agent such as ethylenediaminetetraacetic acid, nitrilotriacetic acid or the like. The chelating agent is used in the form of a salt in an aqueous solution. The ammonium salt is particularly preferred as it is best suited for repeated use of the regenerated ion exchange fiber. It is advantageous to use the chelaing agent in an aqueous solution with a concentration of 0.5 to 3% and a pH of 7 to 9.

The method of this invention is characterized by conducting the elution at a space velocity of 5 or above, preferably above 8. Conventionally, in case of using an ordinary ion exchange resin, it was necessary to keep the space velocity below 1.0 for separating the rare earth metals at a practical yield of at least 80%. According to the method of this invention, quite surprisingly a yield above 80% can be attained at such a high space velocity as mentioned above.

The term "space velocity (S.V.)" used herein means the ratio the volume of an eluting solution passed through the ion exchange fiber in one hour to that of the ion exchange fiber, and it can be calculated from the following equation:

$$S.V. = \frac{V'}{V}$$

(wherein V is the volume of the ion exchange fiber, and V' is the volume of the eluting solution passed through the ion exchange fiber in one hour).

In a preferred mode of practice of the method of this invention, the specified ion exchange fiber is filled in a column and conditioned with a dilute hydrochloric acid solution and a dilute ammonium chloride solution, and then an aqueous solution containing rare earth metals, with its pH adjusted to 1.5, is poured thereinto to have the rare earth metals adsorbed on the ion exchange fiber. The column on which these metals have been adsorbed is washed with water, and then an ammonium ethylenediaminetetraacetate solution with a concentration of 0.1 to 2.0% and a pH of 6 to 9 is passed through the column at a space velocity of 5 or above, preferably above 8.0, to effect elution. The eluate is fractionated in portions of a predetermined amount and rare earth metals contained therein are traced by a fluorescent X-ray method to collect the respective metal fractions. It is thus possible to obtain any desired rare earth metal in a yield of 85% or higher with a purity of above 99.9%. If desired, one or more auxiliary columns may be arranged in series to facilitate separation of the respective rare earth metal components.

The method of this invention enables separation of the rare earth metals with high purities at 5 times or more as high a throughput rate as that in the conventional methods using an ion exchange resin, and thus it is suited as an industrial rare earth metal recovering method.

The present invention will be described in more detail hereinbelow by way of the embodiments thereof.

REFERENTIAL EXAMPLE 1

A spinning solution composed of completely saponified polyvinyl alcohol with an average polymerization degree of 1,200 containing ammonium polyphosphate in an amount of 5% by weight based on said polyvinyl alcohol was dry spun to obtain a polyvinyl alcohol fiber having a size of 150 d/50 f.

This fiber was treated in nitrogen gas at 220° C. for 3 hours, whereby the weight loss amounted to 23% and a dark brown, partially polyenic fiber was formed. This fiber was treated in 98% sulfuric acid at 60° C. for 3 hours and then sufficiently washed in boiling water to obtain an ion exchange fiber S-1.

REFERENTIAL EXAMPLE 2

A polyvinyl alcohol fiber produced in the same way as in Referential Example 1 was treated in the air at 190° C. for 3 hours, whereby a 26% weight loss occurred and a black partially polyenic fiber was formed.

This fiber was subjected to a sulfuric acid treatment under the same conditions as in Referential Example 1 to obtain an ion exchange fiber S-2.

REFERENTIAL EXAMPLE 3

A partially polyenic fiber produced after the manner of Referential Example 2 was treated in 96% sulfuric acid at 90° C. for 3 hours and then washed well with boiling water to obtain an ion exchange fiber S-3.

The properties of the thus obtained ion exchange fibers S-1 to S-3 are shown in Table 1.

TABLE 1

| Ion exchange fiber | Exchange group exchange capacity (meq/g) | | Strong cation Weak cation (molar ratio) | Swelling (%) | Moisture content (%) |
| --- | --- | --- | --- | --- | --- |
| | Strong cation | Weak cation | | | |
| S-1 | 2.5 | 0.5 | 5 | 1.8 | 43.8 |
| S-2 | 2.6 | 1.5 | 1.7 | 1.7 | 41.4 |
| S-3 | 2.3 | 2.3 | 1 | 1.7 | 41.0 |

EXAMPLE 1

Bastnaesite was calcined at 600° to 620° C. for 3 hours and then extracted with 1N nitric acid, followed by removal of cerium in the usual way to prepare a specimen having a rare earth metal content of about 2% and a pH of 1.5.

280 ml of each of the ion exchange fibers obtained in the Referential Examples was filled in a glass column of 3.54 cm in diameter and 35 cm in height and, after conditioning three times each with a 1N hydrochloric acid solution and a 1N ammonium chloride solution, said specimen was passed through the column to have the specimen adsorbed on the fiber, followed by washing with water.

Then the elution was conducted by using a 0.5% aqueous solution of ammonium ethylenediaminetetraacetate (pH 8.5) at a space velocity of 5.0 and the eluate was fractionated in portions of approximately 200 ml. The rare earth metals contained in each fraction were recovered as oxalates and, after calcination, the formed oxides were analyzed by means of fluorescent X-ray.

By way of comparison, the separation of said specimen was conducted under the same conditions as above by using a commercially available ion exchange resin (Diaion PK-228) in an amount (80 ml) that would provide substantially the same ion exchange capacity.

The results are shown in Table 2.

TABLE 2

| Ion exchange fiber | Yield of $La_2O_3$ with 99.9% or higher purity (%) | Maximum concentration (%) | |
| --- | --- | --- | --- |
| | | $Pr_6O_{11}$ | $Nd_2O_3$ |
| S-1 | 85 | 61 | 95 |
| S-2 | 82 | 60 | 89 |
| S-3 | 80 | 83 | 87 |
| Ion exchange resin | 47 | 28 | 71 |

As apparent from this table, the method of this invention can give a far higher yield than with the method using a commercially available ion exchange resin.

EXAMPLE 2

4.25 l of the ion exchange fiber S-1) obtained in Referential Example 1 was filled in a 5-l adsorption column (9.9 cm in diameter and 100 cm in height) and conditioned three times each with a 1N hydrochloric acid solution and a 1N ammonium chloride solution. Then 4.5 l of a nitric acid solution (pH 1.5) containing 2% of a rare earth metal mixture consisting of 66.8% of $La_2O_3$, 23.3% of $Nd_2O_3$, 7.6% of $Pr_6O_{11}$ and 2.3% of other metals prepared from bastnaesite was adsorbed on the column. After washing with water, the mixture was eluted with a 0.5% aqueous solution (pH 8.5) of ammonium ethylenediaminetetraacetate as follows: 97 l of the eluting solution was flown down through the column from the top thereof for 4.5 hours, and gadolinium, samarium, neodymium, praseodymium and lanthanum were fractionated in that order as eluates. These eluates were treated with hydrochloric acid, separated as oxalates and calcined to obtain oxides of the respective rare earth metals. The yield of lanthanum oxide with a purity of above 99.9% was 52.1g (86.7%).

EXAMPLE 3

The 5-l adsorption column used in Example 2 was applied as main column, and three auxiliary columns each filled with 2 l of the same ion exchange fiber were connected thereto in series. Each column was similarly conditioned, with the auxiliary columns being further treated with a 1N zinc chloride solution (pH 1.85).

Then, 4.5 l of a nitric acid solution (pH 1.5) containing 2% of a rare earth metal mixture consisting of 46.5% of $La_2O_3$, 32.6% of $Nd_2O_3$, 10.3% of $Pr_6O_{11}$, 4.6% of $Sm_2O_3$ and 6.0% of other metals prepared from monazite was passed through the main column to have said mixture adsorbed on the column, which was then washed with water. Then a 0.5% aqueous solution (pH 8.5) of ammonium ethylenediaminetetraacetate was flown down through the main column from the top thereof at a space velocity of 8.0, and the elution was interrupted at the moment when the rare earth metal adsorption band has reached the foremost end of the array of the auxiliary columns. After separating the main column and the auxiliary columns from each other, each of them was again subjected to the eluting treatment at the same space velocity. Each of the fractionated eluates was treated with hydrochloric acid and the rare earth metals contained therein were converted into the oxalates, which are then calcined to form the oxides. In this way, there were obtained $La_2O_3$, $Nd_2O_3$, $Pr_6O_{11}$ and $Sm_2O_3$ with purities of above 99.9% in yields of 92%, 82%, 60% and 19%, respectively.

EXAMPLE 4

4.25 l of an ion exchange fiber containing exchange groups with a strong cation exchange capacity of 2.3 meq/g and a weak cation exchange capacity of 1.3 meq/g was filled in a column and, after conditioning similar to Example 2, a nitric acid solution (pH 1.5) containing 2% of the same rare earth metal mixture as that used in Example 2 was passed through the column to have them adsorbed thereon. After washing with water, the elution was conducted as follows by using a 0.5% aqueous solution (pH 8.5) of ammonium nitrilotriacetate. That is, the eluting solution was flown down through the column from the top thereof at a rate of 25 l/hr, and the eluates fractionated for the respective components were treated in the same way as in Example 2 to form the oxides of the respective rare earth metals.

The results of the fluorescent X-ray analysis revealed 87% yield of lanthanum oxide with a purity of above 99.9%. Praseodyminum and neodymium were found enriched to a purity of 66% and 97%, respectively.

What is claimed is:

1. In a method for separating gadolinium, samarium, neodymium, praseodymium, and lanthanum prepared from bastnaesite by selectively adsorbing these rare earth metals on an ion exchanger and then fractionally eluting the respective metals with an aqueous solution of a chelating agent, the improvement in that an ion exchange fiber having a sulfonic group and a carboxyl group is used as the ion exchanges, and the elution is conducted at a space velocity of 5.0 or above.

2. The method according to claim 1, wherein the ion exchange fiber is one in which the sulfonic carboxyl group molar ratio is within the range of 5:1 to 1:1.

3. The method according to claim 1, wherein the aqueous solution of a chelating agent is an aqueous solution of an ammonium salt of ethylenediaminetetraacetic or nitrilotriacetic acid.

* * * * *

UNITED STATES PATENT AND TRADEMARK OFFICE
CERTIFICATE OF CORRECTION

PATENT NO. : 4,514,367
DATED : April 30, 1985
INVENTOR(S) : Tadao Asami et al

It is certified that error appears in the above-identified patent and that said Letters Patent is hereby corrected as shown below:

Col. 4, line 36; - " S-1)" should read -- (S-1) --

Col. 6, line 2 of Claim 2; - "sulfonic carboxyl" should read
-- sulfonic to carboxyl --

Signed and Sealed this

Thirteenth Day of August 1985

[SEAL]

Attest:

DONALD J. QUIGG

Attesting Officer    Acting Commissioner of Patents and Trademarks